United States Patent [19]

Kondo et al.

[11] 4,183,631
[45] Jan. 15, 1980

[54] ELECTROCHROMIC DISPLAY DEVICE

[75] Inventors: Shigeo Kondo; Nobuyuki Yoshiike, both of Hirakata; Masakazu Fukai, Nishinomiya, all of Japan

[73] Assignee: Matsushita Electric Industrial Co., Ltd., Kadoma, Japan

[21] Appl. No.: 867,183

[22] Filed: Jan. 4, 1978

[30] Foreign Application Priority Data

Jan. 10, 1977 [JP] Japan ............................... 52/001667

[51] Int. Cl.$^2$ .............................................. G02F 1/17
[52] U.S. Cl. ...................................................... 350/357
[58] Field of Search ......................................... 350/357

[56] References Cited

U.S. PATENT DOCUMENTS

| | | | |
|---|---|---|---|
| 3,854,794 | 12/1974 | Van Dam | 350/357 |
| 3,978,007 | 8/1976 | Giglia et al. | 350/357 |

OTHER PUBLICATIONS

C. J. Shoot et al., "New Electrochromic Memory Display", *Appl. Phys. Lett.*, vol. 23, No. 2, Jul. 15, 1973, pp. 64–65.

J. J. Cuomo et al., "Conductively Coated Porous Medium for use in Electrochromic Membrane Display," IBM Technical Disclosure Bulletin, vol. 18, No. 11, Apr. 1976, p. 3865.

*Primary Examiner*—James W. Davie
*Attorney, Agent, or Firm*—Cushman, Darby & Cushman

[57] ABSTRACT

An electronic display device is described in which the counter-electrode is made of a layer of porous metal which is electrochemically irreversible as well as a display electrode and an electrolyte containing an electrochromic substance capable of reversibly displaying color together with a solution of metal ions of the porous metal counter electrode. The electrodes and electrolyte are contained within a cell in which, during operation, an electric double layer is formed on the surface of the porous metal counter-electrode.

9 Claims, 14 Drawing Figures

ELECTROCHROMIC DISPLAY DEVICE

BACKGROUND OF THE INVENTION

1. Field of the Invention

This invention relates to an improved electrochromic display device comprising, in a cell, a display electrode a counter-electrode and an electrolyte containing organic electrochromic material.

2. Prior Art

Electrochromic display devices are well known by, for instance, an article by C. J. Schoot et al in Applied Physics Letter, vol. 23, No. 2 published July 15, 1973. In the abovementioned article, N,N'-di-n-heptyl-4,4'-dipyridinium dibromide is used for the electrochromic display substance and pottasium bromide is used for the supporting electrolyte. These materials are disolved in water to make solutions having the concentrations of 0.1 mol/l and 0.3 mol/l in the electrolyte, respectively. A display electrode and a counter-electrode of chemically inert material are disposed in the electrolyte. Furthermore, a reference electrode made with silver and silver bromide is disposed in the electrolyte. In such conventional electrochromic device, the reversible electrochemical reaction of the belowmentioned chemical formula (1) takes place on the display electrode upon writing and erasing:

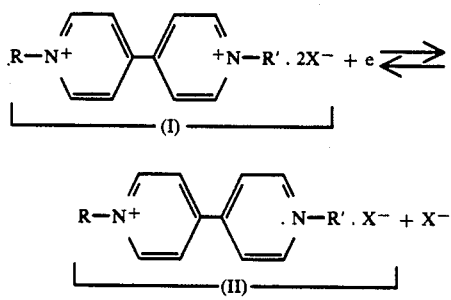

wherein:

R and R' are groups are selected from alkyl groups, phenyl groups, alcoxycarbonylalkyl groups, phenylalkyl groups, and the like.

$X^-$ is an electrochemically inactive monovalent anion selected from $Br^-$, $BF_4^-$, $ClO_4^-$, and the like.

At first, the 4,4'-dipyridinium compound (I) of the abovementioned formula is disolving in the electrolyte in an almost transparent state. Then by applying a specified voltage for producing an electrochemical reduction reaction of the compound (I), the compund (I) is electrochemically reduced to form monocation radical (II) of the 4,4'-dipiridinium compound which radical (II) displays a purple color.

The problem of the conventional electrochromic device is that the monocation radical (II) is further reduced by a lower negative potential to form a diradical (III) shown in the electrochemical formula (2) below:

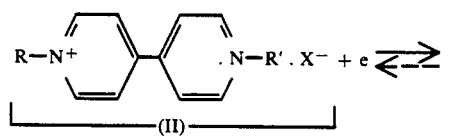

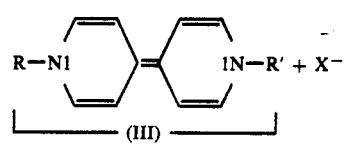

The formation of diradical proceeds irreversibly in the reaction (2) and therefore, the reaction (2) makes erasing of the writing of an image difficult.

Accordingly, in the conventional electrochromic display device, it is necessary to conduct the electrochemical reaction within a potential in a reversible reaction region by carefully controlling the potential of the display electrode. Thus, it has been necessary to provide a reference electrode as described in the abovementioned article.

However, even in such a device of the abovementioned article, it has been difficult to achieve an entirely reversible electrochemical reaction in the device. The difficulty is caused by an irreversibility of the belowmentioned reaction (3) on the counter-electrode:

$$2X^- - 2e \rightleftarrows X_2 \qquad (3)$$

For example, when bromide ions are used for the elctrochemically inactive anions $X^-$, an oxidation reaction takes place on the counter-electrode at a electrode potential within a region more positive than about $+0.65$ V. Furthermore, in this case, a yellow deposit believed to be a bromine complex of the 4,4'-dipyridinium compound is formed on the counter-electrode. Since the electrochemical reduction rate of this oxidation product is very slow, the rate of the abovementioned oxidation reaction becomes the determining rate of the displaying reaction.

Besides the abovementioned reaction to form the complex compound, another reaction according to the formula (1) takes place before initiation of reaction of the formula (3). Accordingly, a further complicated irreversible electrochemical reaction is made on the counter-electrode.

Additionally, since a reference electrode is used, the operating circuit of the electrochromic device of the abovementioned article is complicated.

FIG. 1a shows potential-current curve on the display electrode and FIG. 1b shows the similar characteristic on the counter-electrode. Both diagrams show electrochemical behavior of N,N'-di-n-heptyl-4,4'-dipyridinium dibromide vs. a saturated calomel electrode (SCE). In these diagrams, in the region A, which is a region more negative than a specified negative potential En of about $-0.4$ V, a reduction reaction of the electrochromic material takes place thereby making a reduction current and a writing. When the potential becomes higher than En and is between the potential En and a specified positive potential Ep of about $+0.65$ V, the electrochromic material reduced in the abovementioned reduction reaction in the region A is oxidized, thereby making an oxidation current and an erasing. When the potential is in the C region, namely higher than Ep, anions are oxidized thereby making an oxidation current. When the operating point again comes into the low potential region A, the abovementioned oxidation product of anions is reduced making a reducing current. Accordingly, the erasing of the display is possible.

If the abovementioned reactions on the display electrode are completely reversible to the reactions on the counter-electrode, then the electrochromic device performs ideally without any deterioration. However, as already mentioned, the redox reaction on the counter-electrode is far from an ideal reversible type.

We have made a substantial advance in the art by providing electrochromic display devices having improved performance characteristics as more fully described below.

SUMMARY OF THE INVENTION

The principal object of the present invention is to provide a electrochromic device having a satisfactorily life performance achieved by an improved electrochemical reaction on the counter-electrode.

Another object of the present invention is to provide a simplified electrochromic device and circuit thereof by dispensing with the hitherto used reference electrode.

The abovementioned objects are achieved by utilizing the charging and discharging reaction of a double layer capacity as principal part of the reaction on a counter-electrode of an electrochromic device, which comprises, in a cell, a display electrode, the improved counter-electrode and an electrolyte containing an organic electrochromic material.

BRIEF EXPLANATION OF THE DRAWING

FIG. 3b is a plan view of the electrochromic device of FIG. 3a.

FIG. 3c is a fragmented perspective view of the electrochromic device of FIG. 3a.

FIG. 4b is a plan view of the device of FIG. 4a.

FIG. 6b is a plan view of the electrochromic device of FIG. 6a.

FIG. 6c is a fragmented perspective view of the electrochromic device of FIG. 6a.

DETAILED DESCRIPTION OF THE INVENTION

The characteristic feature of the present invention is that reactions on a counter-electrode use principally a current based on a capacity of the electric double layer.

The present inventors have found that the use of a porous conductor for the counter-electrode causes a large capacitance of several Farads per $Cm^2$, contrasted to the small capacitance values of several hundreds micro Farads per $Cm^2$ of the conventional counter-electrode of plain metal sheet.

In the following, the present invention is elucidated referring to FIGS. 2 to 6c showing preferred examples.

EXAMPLE 1

Figure 3A:
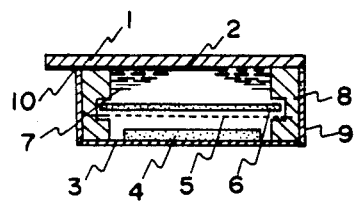
FIG. 3a is a sectional elevation view of an electrochromic device embodying the present invention.
Figure 3B:
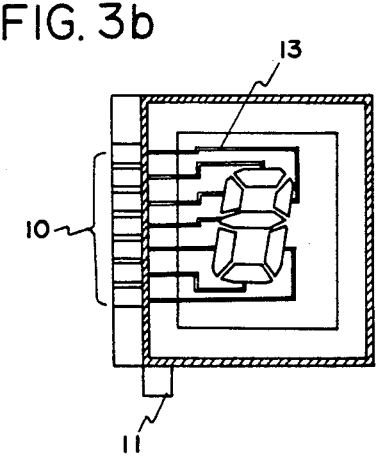
Figure 3C:
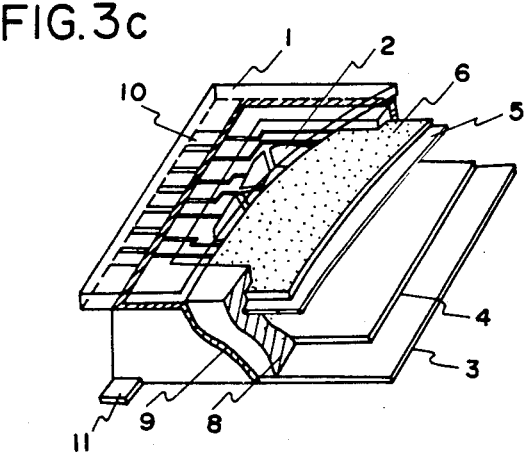

FIG. 3a to FIG. 3c show an example of a basic structure of the electrochromic display device embodying the present invention. In the drawing, on a transparent substrate 1 of glass, transparent thin electrodes 2 (i.e. display electrodes) are formed by vapor-deposition of indium oxide or tin oxide. A nickel sheet 3 serves as a bottom sheet of the device and also as a collector for the counter-electrode 4 made of a porous nickel sheet. The porous counter-electrode 4 is made of a sintered body (10 mm × 10 mm × 1 mm in volume, 80% in porosity) of nickel powder. A separator 5 made of porous polypropylene or cellophane is disposed over the porous counter-electrode. A light-scattering board 6 is disposed between the separate 5 and the display electrodes 2. A side-wall 8 made of a polypropylene block connects the substrate 1 and the nickel sheet 3 to form a cell. Inside the cell is filled with electrolyte 7 containing 0.05 mol/l of N,N'-di-n-octyl-4,4'-dipyridinium dichloride, 0.2 mol/l of potassium chloride and $3 \times 10^{-4}$ mol/l of nickel chloride. The cell is water-tightly and air-tightly wrapped by a layer 9 of epoxy resin. Several terminals 10 are formed on the substrate 1 and are connected to the displaying electrodes 2 through conductors 13. On the surface of the conductor 13, a hard glass (Pyrex by trade mark) is vapor-deposited to form an insulating film to isolate them from the electrolyte. A terminal 11 for the counter-electrode is spot-welded to the porous nickel sheet.

Figure 4A:
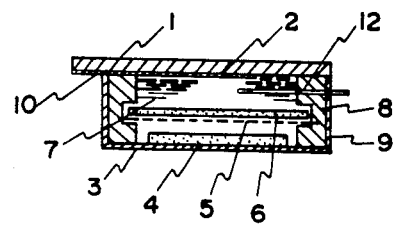
FIG. 4a is a sectional elevation view of electrochromic device similar to FIG. 3a provided with a testing electrode 12.
Figure 4B:
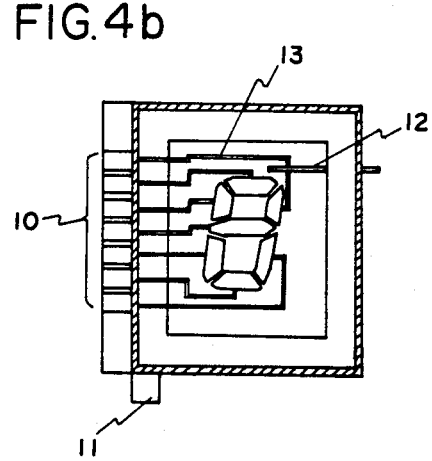

For the purpose of examining life-time characteristics of the abovementioned device, a testing device as shown in FIG. 4a and FIG. 4b was used. The testing device is similarly made to the device of FIGS. 3a to 3c, and is provided with an reference electrode 12 for measuring the amount of polarizations on the displaying electrode 2 and the counter-electrode 4. The reference electrode 12 is made with a gold amalgam.

Figure 1A:
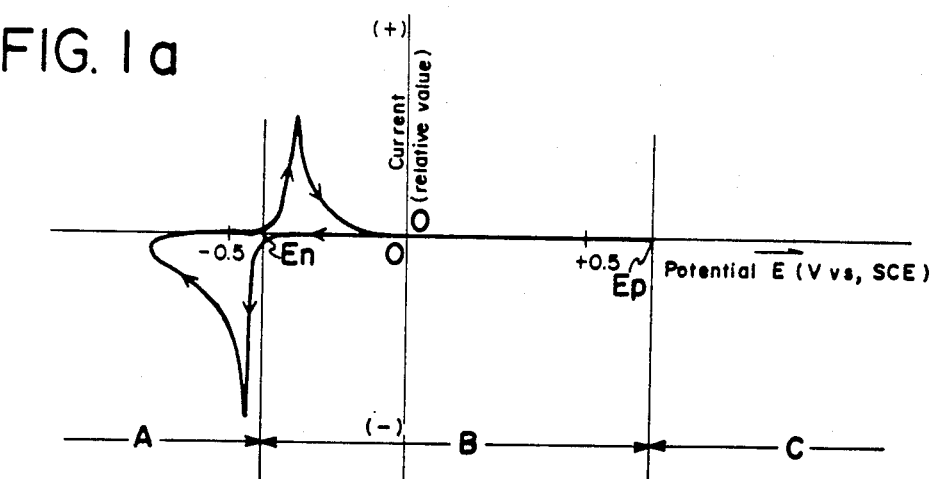
FIG. 1a is a potential-current diagram showing an electrochemical reaction on a display electrode of a typical conventional electrochromic device.
Figure 1B:
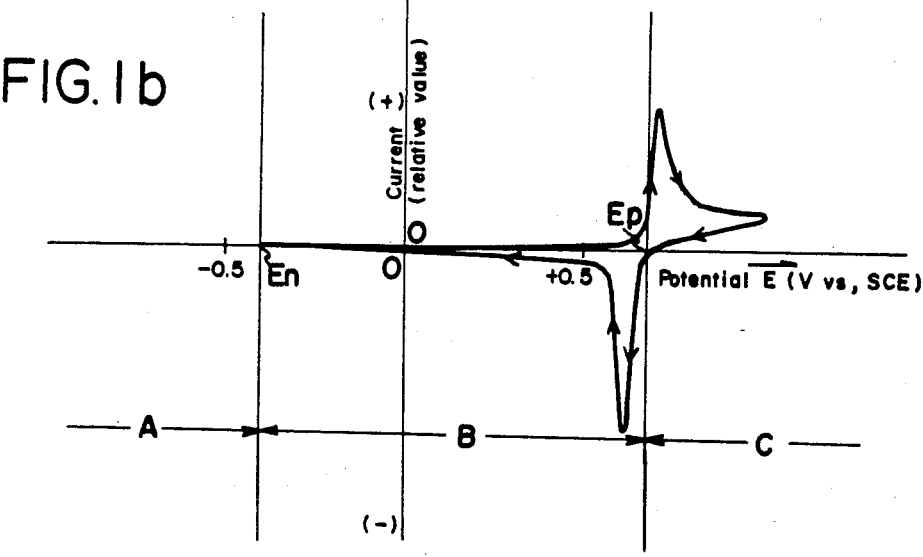
FIG. 1b is a potential-current diagram showing an electrochemical reaction on a counter-electrode of a typical conventional electrochromic device.
Figure 2:
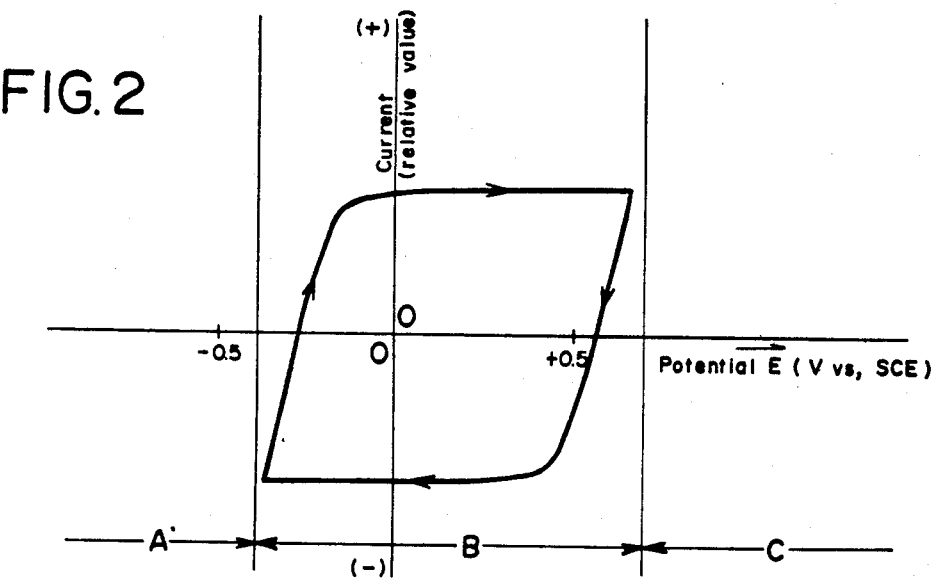
FIG. 2 is a potential-current diagram on a counter-electrode of an electrochromic device embodying the present invention.
Figure 5A:
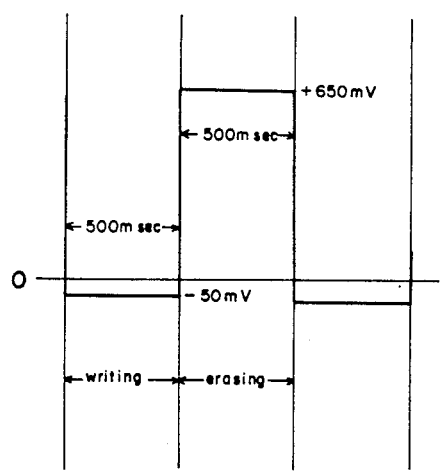
FIG. 5a is a time chart showing the waveform of the applied voltage of the counter-electrode against the display electrode of the electrochromic device embodying the present invention.
Figure 5B:
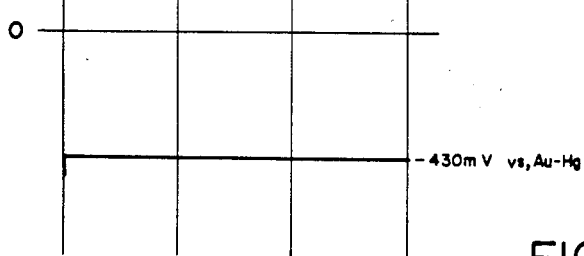
FIG. 5b is a time chart showing the behavior of polarization on the counter-electrode vs. the gold amalgam electrode.
Figure 5C:
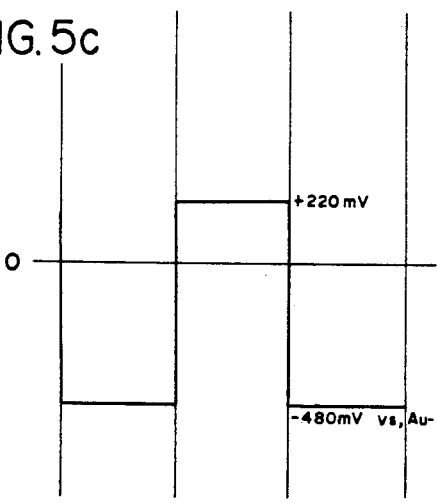
FIG. 5c is a time chart showing the behavior of polarization on the display electrode vs. the gold amalgam electrode.

On the displaying electrodes 2 in the abovementioned testing device, 500 m second width rectangular waves shown in FIG. 5a are impressed with −50 mV (against a potential of the counter-electrode 4) for writing an image and with +650 mV (against a potential of the counter-electrode) for erasing an image, respectively. Transition behavior of potential-time on the counter-electrode 4 vs. the reference electrode 12 is shown in FIG. 5b. The flatness of the curve of FIG. 5b indicates that drift of the potential hardly occurs during a writing of image and during an erasing of image. On the contrary, FIG. 5c shows that a drift of potential of the displaying electrode is −480 mV (vs. gold-amalgam reference electrode) during a writing of an image and is +220 mV (vs. the reference electrode) during an erasing of an image. The potential-current curve of the counter-electrode 4 of the device is shown in FIG. 2, which shows that the operating point is confined within the region B. This means that the current of the counter-electrode is of non-faradic current only. It is observed that the life of the device, indicated by cycles of writing-in and erasing-off measured with the abovementioned rectangular wave voltage, shows no deterioration even after operating the device more than $1.5 \times 10^7$ cycles.

For the sake of comparing the abovementioned example 1 with a reference sample of a conventional device, a conventional electrochromic display device is made using a gold sheet of plain surfaces as a counter-electrode, instead of the porous nickel counter-electrode 3 and the separator 5 in FIG. 4. Then, the life time of the reference sample indicated by the cycles of writing-in and erasing-off of the devices are examined. As a result, it was found that in the reference prior art device the displaying becomes impossible after $1 \times 10^5$ cycles repetition of an impressing voltage of 750 mV at the initial value vs. the counter-electrode for 500 m sec. for writing-in, followed by 0 mV for 500 m sec. vs. the counter-electrode for erasing. And a higher voltage than the abovementioned voltage for the writing-in has to be impressed for realizing a further display. Such phenomenon is caused by a fact that the potential of the counter-electrode changes, consequently changing the actuating voltage in the conventional electrochromic display device.

EXAMPLES 2, 3 and 4

In the electrochromic display device described in Example 1, the porosity of the porous sheet 4 of the counter-electrode 4 was changed in the range of 95 to 65% to examine the characteristics of the images so displayed. The results are shown in Table 1, which shows data of Examples 2, 3 and 4 as well as that of the abovementioned Example 1. From Table 1 it can be seen that all of the measured life-times are satisfactory.

Table 1

| Example No. | Porosity (%) | Life time (Times of repetiton of displaying and erasing) |
|---|---|---|
| 1 | 80 | More than $1.5 \times 10^7$ |
| 2 | 95 | More than $1.2 \times 10^7$ |
| 3 | 70 | More than $1.0 \times 10^7$ |
| 4 | 65 | More than $1.1 \times 10^7$ |

In the above Examples 2, 3 and 4, a spongy sintered nickel body made by blowing a nickel powder suspension ("Celmet" by trade mark produced by Sumitomo Electric Industry, Osaka, Japan) was used for the porous gold sheet. Another method of making the porous sheet is to mix nickel powder with a binder (e.g. a chemically stable copolymer of tetrafluoroethylene and hexafluoropolypropylene) and then press to mold the mixture. The porous sheet made in such a method provides the electrochromic display device with a similar effect to that of Examples 2, 3 and 4.

EXAMPLE 5

In an electrochromic display device an, electrolyte is prepared to contain 0.05 mol/l of N,N'-di-n-octyl-4,4'-dipyridinium dichloride and 0.15 mol/l of nickel chloride, in place of the electrolyte in Example 1. Other details are similar to that of Example 1. The device was subjected to a life test. The device can operate to give a display even after repeated displays and erases of more than $1 \times 10^7$ cycles.

EXAMPLE 6

In place of the electrolyte of the aforementioned Example 1, the electrolyte is prepared to contain 0.05 mol/l of N,N'-di-n-heptyl-4,4'-dipyridinium dibromide, 0.2 mol/l of potassium bromide and $5 \times 10^{-4}$ mol/l of nickel bromide. Other details are similar to those of Example 1.

Additionally, an Ag-reference electrode is disposed therein for taking data of the operating test. For the test, −600 mV (vs. the potential of the Ag-reference electrode) is applied for 500 m sec. to the display electrode for writing an image and 0 mV (vs. the potential of the Ag-reference electrode) is applied for 500 m sec. for erasing the image. Its life-time indicated by the cycle of satisfactory repetitions of writing and erasing was more than $5 \times 10^6$ cycles.

EXAMPLE 7

An electrolyte prepared to contain 0.05 mol/l of N,N'-di-P-cyanophenyl-4,4'-dipyridinium-di-chloride, 0.3 mol of potassium chloride and $5 \times 10^{-4}$ mol/l of nickel chloride is used in place of the electrolyte of Example 1. Other details and actuating condition of this example is also the same as that of Example 1. The device can operate to give a display even after repeated displays and erases of more than $1 \times 10^7$ cycles.

EXAMPLE 8

A porous displaying electrode 2 is made by pressing and then sintering gold powder and an Ag-reference electrode 12 is disposed in the cell. Other details are identical to those of Example 1. In the device, when a voltage is impressed across the displaying electrode 2 and the counter-electrode 4, an electric charge of 2 mC flows and the displaying electrode 2 is negatively charged as a result of a polarization, and a violet compound is electro-deposited on the surface of writing electrode 2 and displays an image. It was confirmed that a potential difference between the displaying electrode 2 and the Ag-reference electrode 12 was approximately 400 mV, and the violet compound electro-deposited on the displaying electrode 2 was the mono-cation radical of N,N'-di-n-heptyl-4,4'-dipyridinium bromide. Further, a potential difference between the counter-electrode 3 and the reference electrode 12 was about 259 mV. Namely, the potential of the counter-electrode 3 is lower than the reaction potential of about +510 mV vs. the Ag-reference electrode for initiating the reaction of

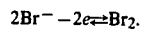

$$2Br^- - 2e \rightleftharpoons Br_2.$$

Thus, it is assumed that, on the counter-electrode, substantially all of the current flowing within the electrochromic display device was consumed for charging and discharging of the capacity of an electric double layer. The life time of the device a similar order to those of the foregoing examples.

EXAMPLE 9

An electrochromic display device is made utilizing a porous carbon sheet for the porous counter-electrode. Other details are similar to those of Example 1.

The life time performance of the abovementioned device is examined by providing it with a reference electrode and under the same operating condition as an Example 1. The life time of the device a similar order to those of the foregoing examples.

The abovementioned porous carbon electrode is made as follows: A mixture of 50 g of acetylene black (i.e. carbon), 20 cc of aqueous suspension of copolymer of tetrafluoroethylenefluoride and hexafluoropolypropylene ("Polyflon" by trade mark of Daikin Kogyo Co., Ltd.) as binder and 50 cc of water was blended together and the mixture is pressed on a substrate with a titanium net inbetween, thereby forming a porous carbon electrode of about 0.6 mm thick.

Figure 6A:
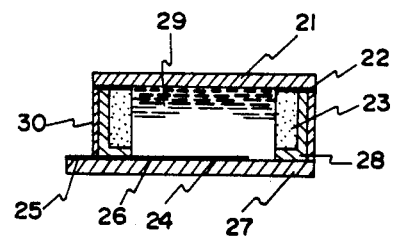
FIG. 6a is a sectional elevation view of another electrochromic device embodying the present invention.
Figure 6B:
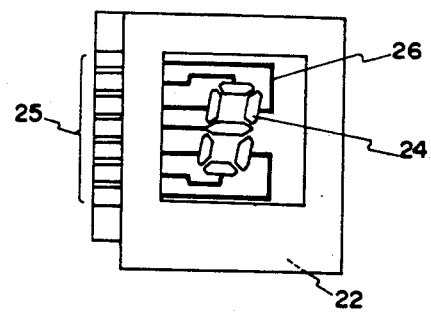
Figure 6C:
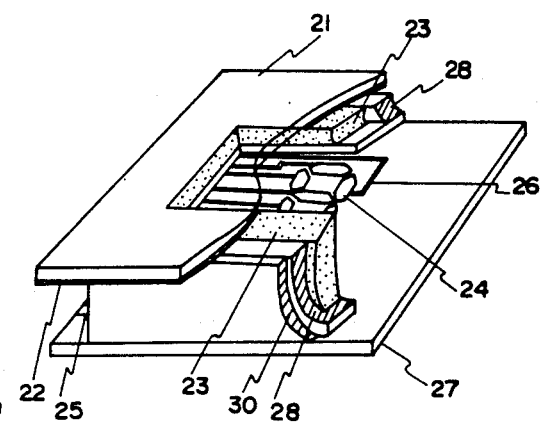

FIG. 6 shows still another example of the electrochromic display device according to the present invention. In the drawing, numeral 21 designates a transparent substrate, numeral 22 designates a metallic thin film which is formed by a vapor-deposition of gold on the transparent substrate 21. A porous counter-electrode 23 is disposed vertically on side walls of the cell. Numeral 24 designates a displaying metal-electrode which is made by applying gold on an insulating substrate 27 by means of a glaze screen printing method, and numeral 25 designates voltage-applying terminals for the displaying electrode. Numeral 26 designates gold conductors connecting the displaying electrode 24 with the voltage-applying terminals 25. The part of the conductor 26 contacting electrolyte 29 is coated by vapor-deposited film of hard glass (Pyrex glass by trade mark) to prevent writing on the conductor 26. Numeral 28 designates a resin block of polypropylene to form a housing and the housing is wrapped by an epoxy resin layer 30 for air-tight and liquid-tight sealing.

The electrochromic material is not limited to the ones used in the examples, and various kinds of other organic-electrochromic material capable of reversiblly exhibiting colors can be used.

What we claim is:

1. In an electrochromic device comprising a display electrode, a counter-electrode and an electrolyte containing an electrochromic material capable of reversibly displaying color all contained within a cell, the improvement wherein said counter-electrode is made of porous metal which is electrochemically irreversible and wherein said electrolyte is an aqueous solution containing metal ions of said counter-electrode, whereby the electrochemical reaction on said counter-electrode is a charge-and-discharge reaction of an electric double layer formed on the surface of said counter-electrode.

2. An electrochromic device of claim 1, wherein said counter-electrode is a combination of a porous conductor and a metal sheet in contact therewith.

3. An electrochromic device of claim 1, wherein porosity of said porous conductor is between 65% and 95%.

4. An electrochromic device of claim 2, wherein porosity of said porous conductor is between 65% and 95%.

5. An electrochromic device of claim 1, wherein said porous conductor is a member selected from the group consisting of sintered powder metal, blown sintered powder metal and a pressed composition of metal powder.

6. The electrochromic device of claim 1, wherein said porous metal is nickel or gold.

7. An electrochromic device of claim 2, wherein said porous metal is nickel or gold.

8. An electrochromic device of claim 1, wherein said electrolyte contains nickel ions.

9. An electrochromic device of claim 1, wherein said electrochromic material is a 4,4'-dipyridinium salt having the composition

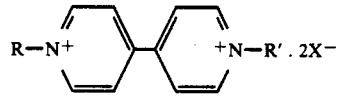

wherein: R and R' are members selected from the group consisting of an alkyl group and a paracyano-phenyl group and X⁻ electrochemically inactive monovalent anion selected from the group consisting of Br⁻ and Cl⁻.

* * * * *

UNITED STATES PATENT AND TRADEMARK OFFICE
CERTIFICATE OF CORRECTION

PATENT NO. : 4,183,631

DATED : January 15, 1980

INVENTOR(S) : KONDO, et al

It is certified that error appears in the above-identified patent and that said Letters Patent are hereby corrected as shown below:

Column 3, lines 53-54: Change "the counter-electrode against the display electrode" to --the display electrode against the counter-electrode--.

Column 4, line 9 and line 11: Change "$Cm^2$" to --$cm^2$--.

Signed and Sealed this

Tenth Day of June 1980

[SEAL]

Attest:

SIDNEY A. DIAMOND

Attesting Officer

Commissioner of Patents and Trademarks